(12) United States Patent
Lu

(10) Patent No.: US 9,077,735 B2
(45) Date of Patent: Jul. 7, 2015

(54) METHOD AND RELATED DEVICE FOR CONTROLLING SERVICE CHARGING

(71) Applicant: HUAWEI TECHNOLOGIES CO., LTD., Shenzhen (CN)

(72) Inventor: Jingshi Lu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 13/712,269

(22) Filed: Dec. 12, 2012

(65) Prior Publication Data

US 2013/0103754 A1    Apr. 25, 2013

Related U.S. Application Data

(63) Continuation of application No. PCT/CN2011/073812, filed on May 9, 2011.

(51) Int. Cl.
| | |
|---|---|
| G06F 15/16 | (2006.01) |
| H04L 29/08 | (2006.01) |
| H04L 12/14 | (2006.01) |
| H04M 15/00 | (2006.01) |
| H04W 4/24 | (2009.01) |

(52) U.S. Cl.
CPC .......... *H04L 67/12* (2013.01); *H04L 12/14* (2013.01); *H04L 12/1485* (2013.01); *H04M 15/00* (2013.01); *H04M 15/80* (2013.01); *H04M 15/8022* (2013.01); *H04W 4/24* (2013.01); *H04L 12/1425* (2013.01); *H04M 15/81* (2013.01)

(58) Field of Classification Search
None
See application file for complete search history.

(56) References Cited

U.S. PATENT DOCUMENTS

| | | | |
|---|---|---|---|
| 2001/0027449 A1 | 10/2001 | Wright | |
| 2007/0005764 A1* | 1/2007 | Teppo | 709/225 |
| 2008/0311883 A1* | 12/2008 | Bellora et al. | 455/406 |
| 2009/0076984 A1 | 3/2009 | Guionnet | |
| 2010/0184403 A1* | 7/2010 | Cai et al. | 455/406 |

(Continued)

FOREIGN PATENT DOCUMENTS

| | | |
|---|---|---|
| CN | 1697388 | 11/2005 |
| CN | 101212532 | 7/2008 |

(Continued)

OTHER PUBLICATIONS

Chinese Office Action dated Aug. 4, 2014 in corresponding Chinese Patent Application No. 201180000508.6.

(Continued)

*Primary Examiner* — Brian P Whipple
(74) *Attorney, Agent, or Firm* — Staas & Halsey LLP

(57) ABSTRACT

Disclosed are a method and a related device for controlling service charging. The method for controlling service charging includes: receiving, by a Diameter credit control DCC server, a credit control request CCR message sent by a DCC client; if at least two tariff time changes TTCs are included within a preset temporary validity time VT from current system time, acquiring, by the DCC server and from the at least two TTCs, a first TTC which is the earliest and a second TTC which is the second earliest; modifying, by the DCC server, the temporary VT according to the first TTC and the second TTC to obtain a modified VT, so that only the first TTC is included in the modified VT from the current system time; and sending, by the DCC server, a credit control answer CCA message to the DCC client, where the CCA message includes the first TTC and the modified VT.

15 Claims, 9 Drawing Sheets

(56) References Cited

U.S. PATENT DOCUMENTS

| | | | |
|---|---|---|---|
| 2011/0066530 A1* | 3/2011 | Cai et al. .................... | 705/30 |
| 2012/0099715 A1* | 4/2012 | Ravishankar et al. ... | 379/114.01 |
| 2013/0279521 A1* | 10/2013 | Perez Martinez et al. .... | 370/468 |
| 2014/0146711 A1* | 5/2014 | Xue et al. ................... | 370/259 |

FOREIGN PATENT DOCUMENTS

| | | |
|---|---|---|
| CN | 101222559 | 7/2008 |
| CN | 101902721 | 12/2010 |

OTHER PUBLICATIONS

International Search Report issued Feb. 23, 2012 in corresponding International Patent Application No. PCT/CN2011/073812.

Written Opinion of the International Searching Authority issued Feb. 23, 2012 in corresponding International Patent Application No. PCT/CN2011/073812.

Extended European Search Report mailed Mar. 12, 2013 for corresponding European Application No. 11762042.7.

Nokia (Benni.Alexander@Nokia.com), "Clarification of tariff time change handling", 3GPP Draft, S5-044760 Clarification of Tariff Time Change Handling, $3^{rd}$ Generation Partnership Project (3GPP), Mobile Conference Centre, vol. SA WG5, No. Sanya, China, Nov. 6, 2004, XP050300072, 3 pp.

H. Hakala et al., "Diameter Credit-Control Application", Network Working Group, Request for Comments: 4006, Category: Standards Track, Aug. 1, 2005, pp. 1-114.

3GPP™, "$3^{rd}$ Generation Partnership Project: Technical Specification Group Aspects; Telecommunication management; Charging management; Diameter charging applications (Release 9)", 3GPP TS 32.299, V9.2.0, vol. SA WG3, $3^{rd}$ Generation Partnership Project (3GPP), Mobile Competence Centre, Dec. 18, 2009, pp. 1-147.

\* cited by examiner

METHOD AND RELATED DEVICE FOR CONTROLLING SERVICE CHARGING

CROSS-REFERENCE TO RELATED APPLICATIONS

This application is a continuation of International Application No. PCT/CN2011/073812, filed on May 9, 2011, which are hereby incorporated by reference in their entireties.

FIELD OF THE INVENTION

Embodiments of the present invention relate to the field of communications, and in particular, to a method and a related device for controlling service charging.

BACKGROUND OF THE INVENTION

Currently, in a Diameter credit control (DCC, Diameter Credit Control) protocol, a DCC client, such as a gateway GPRS support node (GGSN, Gateway GPRS Support Node), may send a credit control request (CCR, Credit Control Request) message to a DCC server, such as an online charge system (OCS, Online Charge System), to apply for a granted service unit; the DCC server may feed back a credit control answer (CCA, Credit Control Answer) message to the DCC client to allocate the granted service unit.

The CCA message sent by the DCC server may carry a validity time (VT, Validity Time) used for indicating the validity of the granted service unit, and also used for indicating that the DCC client needs to send a CCR message within the VT again.

In order to reasonably allocate limited network resources and try to avoid network congestion due to applications for the network resources by a large number of users at the same time, an operator may divide into different time periods according to use habits of the users, and arrange different tariffs for the different time periods. Take a wireless Internet access service for example, a period from 18:00 to 23:59 in a day tends to be an online peak, and data traffic in the network is quite large, while data traffic from 0:00 to 17:59 is relatively small, so that the operator may arrange a tariff of "2 yuan/MB" for the period from 18:00 to 23:59, and arrange a tariff of "0.5 yuan/MB" for the period from 0:00 to 17:59, where 0:00 and 18:00 are tariff time changes (TTC, Tariff Time Change).

If the operator arranges a TTC, a CCA message sent to the DCC client by the DCC server may carry the TTC; the DCC client collects statistics on a used service unit before the TTC and a used service unit after the TTC respectively, and reports, through a next CCR message, the used service unit to the DCC server for charging.

However, in the current DCC protocol, a DCC server feeds back a CCA message only after a CCR message sent by a DCC client is received, and each CCA message carries one TTC and a VT, so that if a tariff is switched in a high frequency, for example, there are multiple tariff time changes in a VT, the DCC client is capable of collecting statistics on the used service unit merely according to the TTC carried in the CCA message, and ignores other TTCs in the VT, which therefore may lead to an error in statistical data, and affect the accuracy of charging.

SUMMARY OF THE INVENTION

Embodiments of the present invention provide a method and a related device for controlling service charging, which are capable of effectively improving the accuracy of charging.

An embodiment of the present invention provides a method for controlling service charging, which includes: receiving, by a Diameter credit control DCC server, a credit control request CCR message sent by a DCC client;

if at least two tariff time changes TTCs are included in a preset temporary validity time VT from current system time, acquiring, by the DCC server and from the at least two TTCs, a first TTC which is the earliest and a second TTC which is the second earliest; modifying, by the DCC server, the temporary VT according to the first TTC and the second TTC to obtain a modified VT, so that only the first TTC is included in the modified VT from the current system time; and sending, by the DCC server, a credit control answer CCA message to the DCC client, where the CCA message includes the first TTC and the modified VT.

An embodiment of the present invention further provides a method for controlling service charging, which includes:

receiving, by a Diameter credit control DCC server, a credit control request CCR message sent by a DCC client;

acquiring, by the DCC server, all tariff time changes TTCs included within a preset temporary validity time VT from current system time;

reporting, by the DCC server, the temporary VT and a TTC list including all the TTCs, to a data processing device;

receiving, by the DCC server, a first TTC and a modified VT that are fed back by the data processing device, where the modified VT is the VT obtained by the data processing device after modifying the temporary VT according to the first TTC and a second TTC; the first TTC and the second TTC are two TTCs which are relatively early within the preset temporary VT from the current system time; and sending, by the DCC server, a credit control answer CCA message to the DCC client, where the CCA message includes the first TTC and the modified VT.

An embodiment of the present invention further provides a method for controlling service charging, which includes: receiving, by a data processing device, a tariff time change TTC list and a preset temporary validity time VT that are sent by a DCC server;

if the TTC list includes at least two TTCs, acquiring, by the data processing device and from the TTC list, a first TTC which is the earliest and a second TTC which is the second earliest;

modifying, by the data processing device, the temporary VT according to the first TTC and the second TTC to obtain a modified VT, so that only the first TTC is included in the modified VT from current system time; and feeding back, by the data processing device, the first TTC and the modified VT to the DCC server.

An embodiment of the present invention further provides a method for controlling service charging, which includes:

receiving, by a Diameter credit control DCC server, a credit control request CCR message sent by a DCC client; and if at least two tariff time changes TTCs are included within a preset validity time VT from current system time, sending, by the DCC server, a credit control answer CCA message to the DCC client, where the CCA message includes the at least two TTCs and the VT.

An embodiment of the present invention further provides a method for controlling service charging, which includes:

sending, by a Diameter credit control DCC client, a credit control request CCR message to a DCC server;

receiving, by the DCC client, a credit control answer CCA message sent by the DCC server, where the CCA message includes at least two TTCs and a preset VT;

for each TTC within the VT from current system time, collecting, by the DCC client, statistics on used service unit information before the TTC and used service unit information after the TTC of a user respectively; and when the VT times out, sending, by the DCC client, a CCR message to the DCC server, where the CCR message includes used service unit information that is statistically obtained.

An embodiment of the present invention provides a DCC server, which includes:

a reception unit, configure to receive a credit control request CCR message sent by a DCC client;

an acquisition unit, configured to: when at least two tariff time changes TTCs are included within a preset temporary validity time VT from current system time, acquire, from the at least two TTCs, a first TTC which is the earliest and a second TTC which is the second earliest;

a modification unit, configured to modify the temporary VT according to the first TTC and the second TTC to obtain a modified VT, so that only the first TTC is included in the modified VT from the current system time; and a sending unit, configured to send a credit control answer CCA message to the DCC client, where the CCA message includes the first TTC and the modified VT.

An embodiment of the present invention further provides a DCC server, which includes:

a message receiving unit, configure to receive a credit control request CCR message sent by a DCC client;

an information acquiring unit, configured to acquire all tariff time changes TTCs included within a preset temporary validity time VT from current system time;

an information reporting unit, configured to report, to a data processing device, the temporary VT and a TTC list including all the TTCs;

an information receiving unit, configured to receive a first TTC and a modified VT that are fed back by the data processing device, where the modified VT is the VT obtained by the data processing device after modifying the temporary VT according to the first TTC and a second TTC;

the first TTC and the second TTC are two TTCs which are relatively early within the preset temporary VT from the current system time; and a message sending unit, configured to send a credit control answer CCA message to the DCC client, where the CCA message includes the first TTC and the modified VT.

An embodiment of the present invention provides a data processing device, which includes:

an information receiving unit, configured to receive a tariff time change TTC list and a preset temporary validity time VT that are sent by a DCC server;

a time change acquiring unit, configured to: when the TTC list includes at least two TTCs, acquire, from the TTC list, a first TTC which is the earliest and a second TTC which is the second earliest;

an information modifying unit, configured to modify the temporary VT according to the first TTC and the second TTC to obtain a modified VT, so that only the first TTC is included in the modified VT from current system time; an an information sending unit, configured to feed back the first TTC and the modified VT to the DCC server.

An embodiment of the present invention provides a DCC server, which includes:

a request receiving unit, configure to receive a credit control request CCR message sent by a DCC client; and an answer sending unit, configured to: when at least two tariff time changes TTCs are included within a preset validity time VT from current system time, send a credit control answer CCA message to the DCC client, where the CCA message includes the at least two TTCs and the VT.

An embodiment of the present invention provides a DCC client, which includes:

a request sending unit, configure to send a credit control request CCR message to a DCC server;

an answer receiving unit, configured to receive a credit control answer CCA message sent by the DCC server, where the CCA message includes at least two TTCs and a preset VT;

a statistics unit, configured to: for each TTC within the VT from current system time, collect statistics on used service unit information before the TTC and used service unit information after the TTC of a user respectively; and a charging request unit, configured to: when the VT times out, send a CCR message to the DCC server, where the CCR message includes the used service unit information that is statistically obtained.

In the embodiments of the present invention, after a DCC server receives a CCR message sent by a DCC client, if at least two TTCs are included within a preset temporary VT from current system time, the DCC server acquires, from the TTCs, a first TTC which is the earliest and a second TTC which is the second earliest, and modifies the temporary VT according to the first TTC and the second TTC to obtain a modified VT, so that only the first TTC is included in the modified VT from the current system time, that is, the DCC server dynamically adjusts the VT, so that only one TTC may be included within each VT. Therefore, the DCC client is prevented from ignoring the TTC in a performance of collecting statistics on a used service unit, thereby effectively improving the accuracy of charging.

DETAILED DESCRIPTION OF THE EMBODIMENTS

Embodiments of the present invention provide a method and a related device for controlling service charging, which are capable of improving the accuracy of charging.

Figure 1:
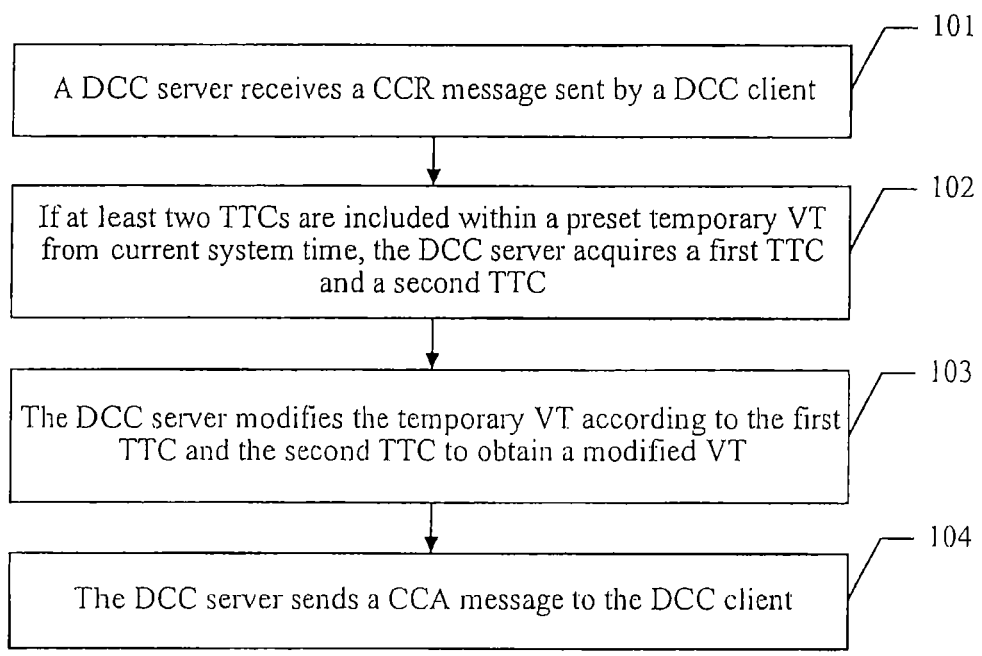
FIG. 1 is a schematic diagram of an embodiment of a method for controlling service charging of the present invention.

Referring to FIG. 1, an embodiment of a method for controlling service charging of the present invention includes the following:

101: A DCC server receives a CCR message sent by a DCC client.

In this embodiment, when requesting the DCC server to allocate a granted service unit, the DCC client sends the CCR message to the DCC server, where the CCR message may carry a requested service unit (RSU, Requested Service Unit).

102: If at least two TTCs are included within a preset temporary VT from current system time, the DCC server acquires, from the at least two TTCs, a first TTC which is the earliest and a second TTC which is the second earliest.

After receiving the CCR message sent by the DCC client, the DCC server determines the current system time and acquires the preset temporary VT, where the temporary VT is generally 3600 seconds or 7200 seconds, and a specific numerical value is related to an actual application and is not limited here.

The DCC server judges the number of the TTCs included within the preset temporary VT from the current system time. If it is found that at least two TTCs are included, the DCC server may acquire, from the at least two TTCs according to a chronological sequence, the first TTC which is the earliest and the second TTC which is the second earliest.

103: The DCC server modifies the temporary VT according to the first TTC and the second TTC to obtain a modified VT.

After acquiring the first TTC and the second TTC, the DCC server may modify the temporary VT according to the first TTC and the second TTC to obtain the modified VT, so that only the first TTC is included in the modified VT from the current system time.

104: The DCC server sends a CCA message to the DCC client.

After obtaining the modified VT by modifying the temporary VT according to the first TTC and the second TTC, the DCC server may send the CCA message to the DCC client, where the CCA message may include the first TTC and the modified VT, in addition, a granted service unit (GSU, Granted Service Unit) allocated for a user may also be included.

In this embodiment, after a DCC server receives a CCR message sent by a DCC client, if at least two TTCs are included within a preset temporary VT from current system time, the DCC server acquires, from the TTCs, a first TTC which is the earliest and a second TTC which is the second earliest, and modifies the temporary VT according to the first TTC and the second TTC to obtain a modified VT, so that only the first TTC is included in the modified VT from the current system time, that is, the DCC server dynamically adjusts the VT, so that only one TTC is included within each VT. Therefore, the DCC client is prevented from ignoring the TTC in a performance of collecting statistics on a used service unit, thereby effectively improving the accuracy of charging.

Figure 2:
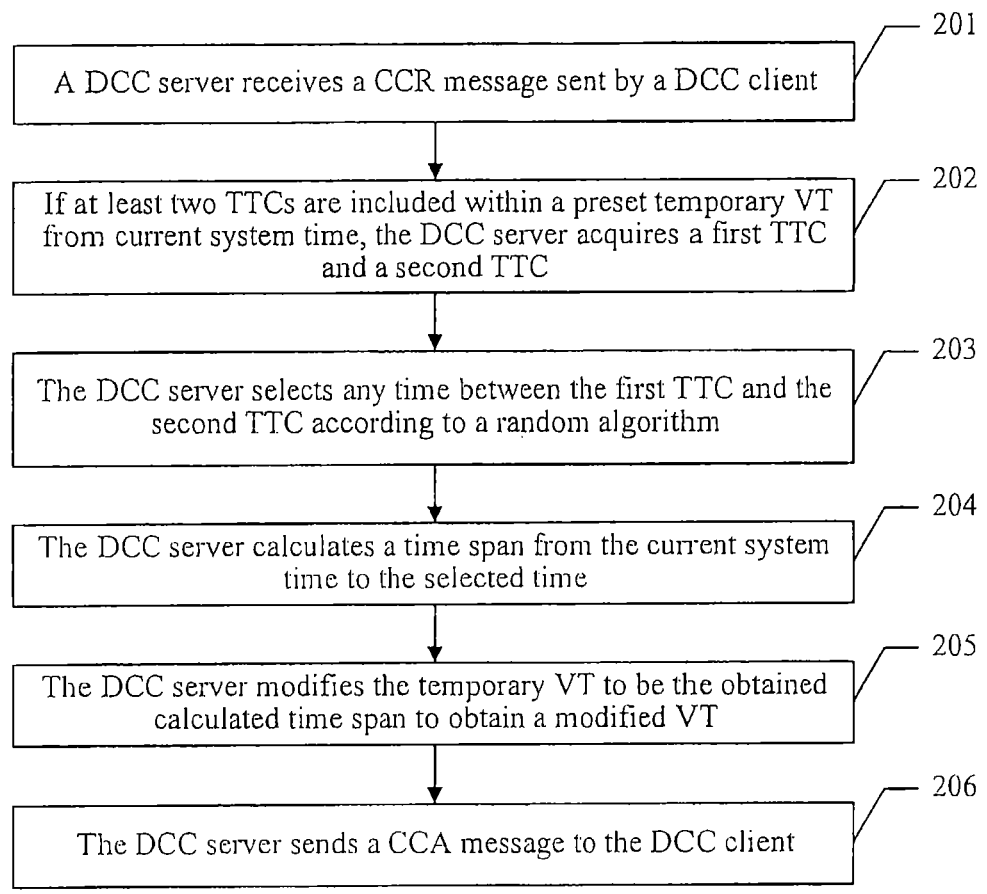
FIG. 2 is a schematic diagram of another embodiment of a method for controlling service charging of the present invention.

For convenience of understanding, a specific example is used for illustrating the method for controlling service charging of the present invention below in detail. Referring to FIG. 2, another embodiment of the method for controlling service charging of the present invention includes the following:

201: A DCC server receives a CCR message sent by a DCC client.

In this embodiment, when requesting an OCS to allocate a granted service unit, a GGSN sends the CCR message to the OCS, where the CCR message may carry an RSU.

The DCC server in this embodiment may be an OCS or other similar charging systems;

the DCC client may be a GGSN or other similar network elements.

In this embodiment, a case where merely the OCS and the GGSN are used as the DCC server and the DCC client respectively is taken as an example for illustrating.

202: If at least two TTCs are included within a preset temporary VT from current system time, the DCC server acquires, from the at least two TTCs, a first TTC which is the earliest and a second TTC which is the second earliest.

After receiving the CCR message sent by the GGSN, the OCS determines the current system time and acquires the preset temporary VT, where the temporary VT is generally 3600 seconds or 7200 seconds, and the specific numerical value is related to an actual application and is not limited here.

The OCS judges the number of the TTCs included within the preset temporary VT from the current system time. If it is found that at least two TTCs are included in the temporary VT, the OCS may acquire, from the at least two TTCs according to a chronological sequence, the first TTC which is the earliest and the second TTC which is the second earliest.

In this embodiment, it is supposed that the current system time is 9:30, and the temporary VT is set to be 7200 seconds, the OCS may query for the number of the TTCs included within the time period from 9:30 to 11:30. It should be noted that, the OCS is locally preset with a list including all TTCs, so that the OCS is capable of querying for the TTC in a certain time period.

If the OCS determines that three TTCs are included within the time period from 9:30 to 11:30, which are 10:00, 10:30, and 11:00 respectively, the OCS may acquire a first TTC (that is, 10:00) which is the earliest and a second TTC (10:30) which is the second earliest from the three TTCs according to the chronological sequence.

It should be noted that, if the OCS determines that only one TTC is included within the time period from 9:30 to 11:30, the OCS may directly feeds back a CCA message to the GGSN, where the CCA message includes the TTC and the temporary VT. This process is similar to a process in the prior art, and is not repeated here.

203: The DCC server selects any time between the first TTC and the second TTC according to a random algorithm.

After determining the first TTC and the second TTC, the OCS may select any time between the first TTC and the second TTC according to the random algorithm.

For example, the first TTC is 10:00, and the second TTC is 10:30; the OCS may select any time between 10:00 and 10:30, such as 10:06, or 10:15, or 10:24, according to the random algorithm.

The random algorithm in this embodiment may be implemented by using a random function Rand ( ) and may also be implemented by using other manners, which is not limited here.

In this embodiment and subsequent embodiments, the OCS may select any time between the first TTC and the second TTC according to the random algorithm. Understandably, in an actual application, the OCS may also directly select the second TTC as the selected time. In this way, at the time of the second TTC a large number of CCR messages may be reported, which may cause network congestion. However, in this way, the OCS does not need to invoke the random algorithm, and to some extent, may decrease a processing load on the OCS.

It should be noted that, the OCS may determine, according to an actual situation, a manner to be used, for example, when the OCS forecasts that a network at the time of the second TTC is relatively idle, the OCS may directly select the second TTC as the selected time; when determining that a load of the OCS is relatively low, the OCS may select any time between the first TTC and the second TTC according to the random algorithm. The specific selecting manner is not limited here.

204: The DCC server calculates a time span from the current system time to the selected time.

After selecting the time, the OCS may calculate the time span from the current system time to the selected time.

The current system time is 9:30, and the selected time is supposed to be 10:06, then the time span is calculated to be 36*60=2160 seconds.

It should be noted that, an order of magnitude of time spent in signaling transmitting between the GGSN and the OCS and an order of magnitude of time spent in internal processing performed by the OCS are all orders of millisecond, or even orders of microsecond, so that impacts of the time are ignored in this embodiment and the subsequent embodiments.

For example, the current system time in step 202 is 9:30, the time spent in executing step 202 and step 203 by the OCS is 10 milliseconds, so that in step 203 the current system time may still be regarded as 9:30.

205: The DCC server modifies the temporary VT to be the calculated time span to obtain a modified VT.

The OCS may modify the temporary VT by using the calculated time span. By modifying the temporary VT to be the calculated time span, the modified VT is obtained.

206: The DCC server sends a CCA message to the DCC client.

After obtaining the modified VT, the OCS may send the CCA message to the GGSN, where the CCA message may include the aforementioned first TTC (10:00) and modified VT (2160 seconds), and in addition, may also include a GSU allocated to a user.

After the GGSN receives the CCA message, the GGSN may acquire the first TTC and the modified VT, and may also acquire the GSU at the same time, and then the GGSN may start to collect statistics on a used service unit (USU, Used Service Unit) of the user. Because the TTC is set, the GGSN needs to collect statistics on USU1 before the first TTC and USU2 after the first TTC.

In this embodiment, the time spent in signaling transmitting between the GGSN and the OCS and the time spent in internal processing of the OCS may be ignored, so that when the GGSN receives the CCA message, the current system time may still be regarded as 9:30; when the modified VT times out, that is, when the system time reaches 10:06, the GGSN sends the CCR message to the OCS again, where the CCR message carries USU1 and the USU2 that are statistically obtained, and may also carry the RSU at the same time.

When receiving the CCR message sent by the GGSN, according to USU1 and USU2 in the CCR message, the OCS may perform charging in accordance with preset different tariffs.

Simultaneously, the operation of step 201 to step 206 may be performed, and details are not repeated here.

In this embodiment, after an OCS receives a CCR message sent by a GGSN, if at least two TTCs are included within a preset temporary VT from current system time, the OCS acquires, from the TTCs, a first TTC which is the earliest and a second TTC which is the second earliest, and modifies the temporary VT according to the first TTC and the second TTC to obtain a modified VT, so that only the first TTC is included in the modified VT from the current system time, that is, the OCS dynamically adjusts the VT, so that only one TTC is included within each VT. Therefore, the GGSN is prevented from ignoring the TTC in a performance of collecting statistics on the used service unit, thereby effectively improving the accuracy of charging.

Figure 3:
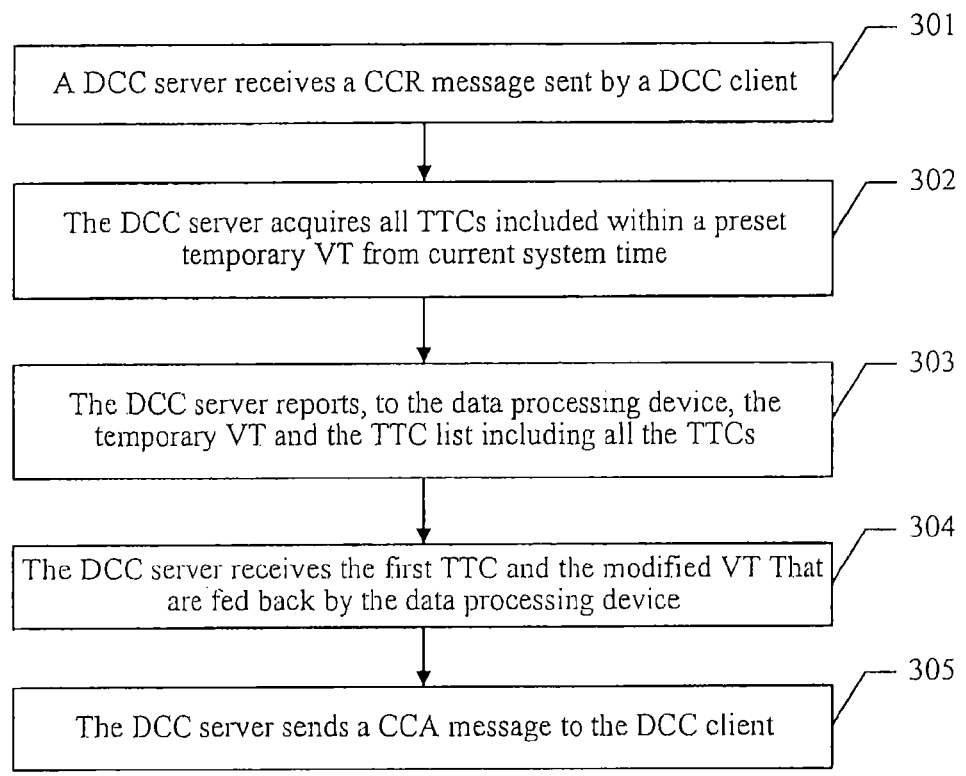
FIG. 3 is a schematic diagram of another embodiment of a method for controlling service charging of the present invention.

In the above embodiments, the OCS may perform dynamic adjustment on the VT locally. In an actual application, an independent data processing device may also perform dynamic adjustment on the VT. By interacting with the data processing device, the OCS obtains the modified VT and the first TTC. Reference may be made to FIG. 3 for details. Another embodiment of the method for controlling service charging of the present invention includes the following:

301: A DCC server receives a CCR message sent by a DCC client.

In this embodiment, step 301 may be similar to step 101 in the aforementioned embodiment illustrated by FIG. 1, or similar to step 201 in the embodiment illustrated by FIG. 2, which is not specifically repeated here.

The DCC server in this embodiment may be an OCS or other similar charging systems; the DCC client may be a GGSN or other similar network elements.

In this embodiment, a case where merely the OCS and the GGSN are used as the DCC server and the DCC client respectively is taken as an example for illustrating.

302: The DCC server acquires all tariff time changes TTCs included within a preset temporary VT from current system time.

After receiving the CCR message sent from the GGSN, the OCS determines the current system time and acquires the preset temporary VT, where the temporary VT is generally 3600 seconds or 7200 seconds, and the specific numerical value is related to an actual application and is not limited here.

The OCS is locally preset with a list including all TTCs, so that the OCS is capable of acquiring all the TTCs included within the preset temporary VT from the current system time.

303: The DCC server reports, to the data processing device, the temporary VT and the TTC list including all the TTCs.

The OCS determines all the TTCs included within the preset temporary VT from the current system time, and may report, to the data processing device, the temporary VT and the TTC list including the TTCs.

The data processing device in this embodiment may be an independent server or other network elements having a computing processing function, which is not specifically limited here.

304: The DCC server receives the first TTC and the modified VT that are fed back by the data processing device.

In this embodiment, after sending the temporary VT and the TTC list to the data processing device, the OCS is capable of receiving the first TTC and the modified VT from the data processing device, where the modified VT is the VT obtained by the data processing device after modifying the temporary VT according to the first TTC and a second TTC; the first TTC and the second TTC are two TTCs which are relatively early within the preset temporary VT from the current system time.

305: The DCC server sends a credit control answer CCA message to the DCC client.

In this embodiment, step 305 may be similar to step 104 in the aforementioned embodiment illustrated by FIG. 1, or similar to step 206 in the embodiment illustrated by FIG. 2, which is not specifically repeated here.

In this embodiment, after receiving a CCR message sent by a GGSN, an OCS may acquire TTCs included within a preset temporary VT from current system time, and send the temporary VT and the TTCs to a data processing device. After receiving a first TTC and a modified VT from the data processing device, the OCS may send a CCA message to the GGSN. Because only the first TTC is included in the modified VT from the current system time, that is, only one TTC may be included in each VT, the GGSN is prevented from ignoring the TTC in a performance of collecting statistics on the used service unit, thereby effectively improving the accuracy of charging.

Figure 4:
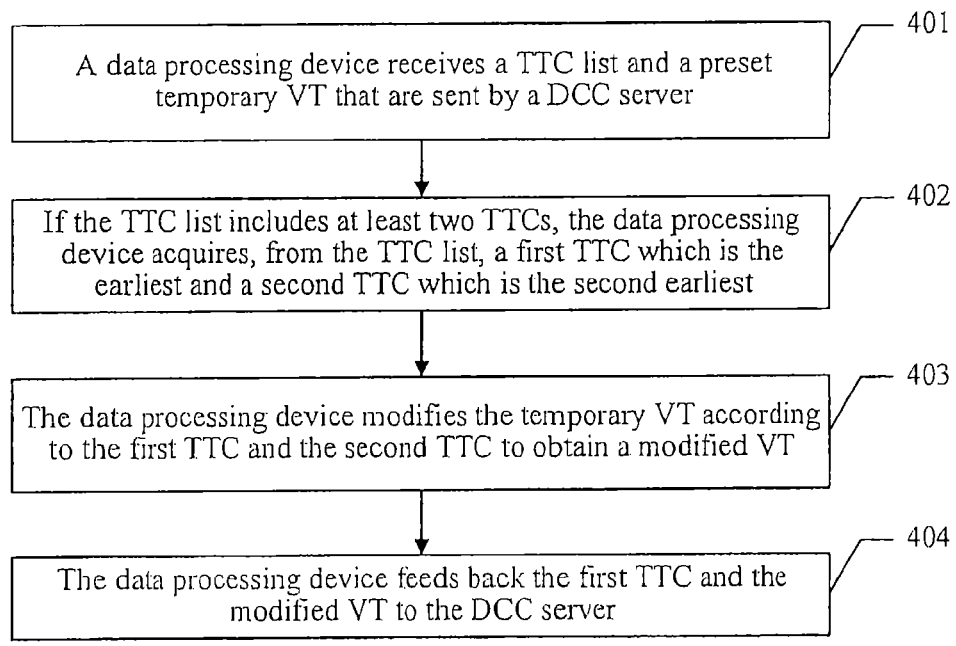
FIG. 4 is a schematic diagram of another embodiment of a method for controlling service charging of the present invention.

The above illustrates the method for controlling service charging of the present invention from the perspective of a DCC server, while the following performs illustration from the perspective of a data processing device. Referring to FIG. 4, another embodiment of the method for controlling service charging of the present invention includes the following:

401: A data processing device receives a TTC list and a preset temporary VT that are sent by a DCC server.

When an OCS receives the CCR message from a GGSN, the OCS may send the TTC list and the preset temporary VT to the data processing device.

The DCC server in this embodiment may be an OCS or other similar charging systems; the DCC client may be a GGSN or other similar network elements.

In this embodiment, a case where merely the OCS and the GGSN are used as the DCC server and the DCC client respectively is taken as an example for illustrating.

402: If the TTC list includes at least two TTCs, the data processing device acquires, from the TTC list, a first TTC which is the earliest and a second TTC which is the second earliest.

In this embodiment, the TTC list includes all TTCs included within the preset temporary VT from the current system time. If the data processing device determines that at least two TTCs are included in the TTC list, the data processing device may acquire, from the TTC list, the first TTC which is the earliest and the second TTC which is the second earliest.

403: The data processing device modifies the temporary VT according to the first TTC and the second TTC to obtain a modified VT.

In this embodiment, step 403 may be similar to the content described in step 203 to step 205 in the aforementioned embodiment illustrated by FIG. 2, which is not specifically repeated here.

404: The data processing device feeds back the first TTC and the modified VT to the OCS.

After determining the first TTC and the modified VT, the data processing device may feed back the first TTC and the modified VT to the OCS.

In this embodiment, a data processing device may modify a temporary VT according to a first TTC and a second TTC to obtain a modified VT, so that only the first TTC is included in the modified VT from current system time, and the first TTC and the modified VT may be sent to an OCS, that is, the data processing device dynamically adjusts the VT, so that only one TTC may be included in each VT. Therefore, a GGSN is prevented from ignoring the TTC in a performance of collecting statistics on the used service unit, thereby effectively improving the accuracy of charging.

Figure 5:
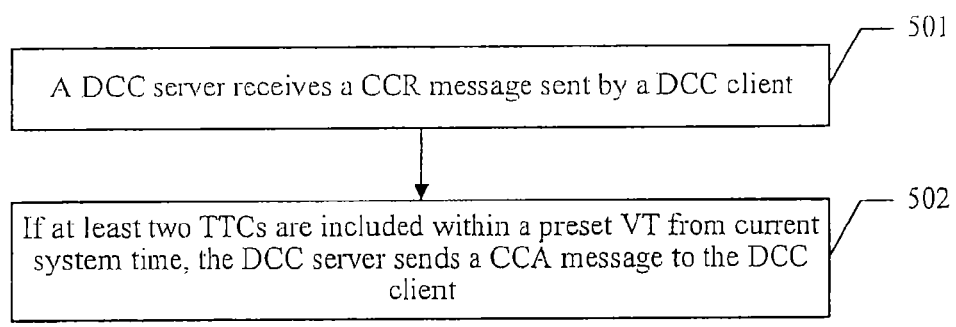
FIG. 5 is a schematic diagram of another embodiment of a method for controlling service charging of the present invention.

In each of the above embodiments, only one TTC is included in a CCA sent to a DCC client by a DCC server at every time, in this way, technical solutions of the present invention are enabled as far as not to modify the content of a DCC protocol. In an actual application, the DCC protocol may also be modified appropriately, so that multiple TTCs are included in the CCA sent to the DCC client by the DCC server. Referring to FIG. 5, another embodiment of the method for controlling service charging of the present invention includes the following:

501: A DCC server receives a CCR message sent by a DCC client.

In this embodiment, step 501 may be similar to step 101 in the aforementioned embodiment illustrated by FIG. 1, or similar to step 201 in the embodiment illustrated by FIG. 2, which is not specifically repeated here.

The DCC server in this embodiment may be an OCS or other similar charging systems; the DCC client may be a GGSN or other similar network elements.

In this embodiment, a case where merely the OCS and the GGSN are used as the DCC server and the DCC client respectively is taken as an example for illustrating.

502: If at least two TTCs are included within a preset VT from current system time, the DCC server sends a CCA message to the DCC client.

In this embodiment, if the OCS determines that at least two TTCs are included within the preset VT from the current system time, the OCS may send the CCA message to the GGSN, where the CCA message includes the VT and the at least two TTCs.

In this embodiment, after receiving a CCR message sent by a GGSN, an OCS may acquire TTCs included within a preset VT from current system time, and send the VT and the TTCs to the GGSN through a CCA message, so that the GGSN is prevented from ignoring the TTC in a performance of collecting statistics on the used service unit, thereby effectively improving the accuracy of charging.

Figure 6:
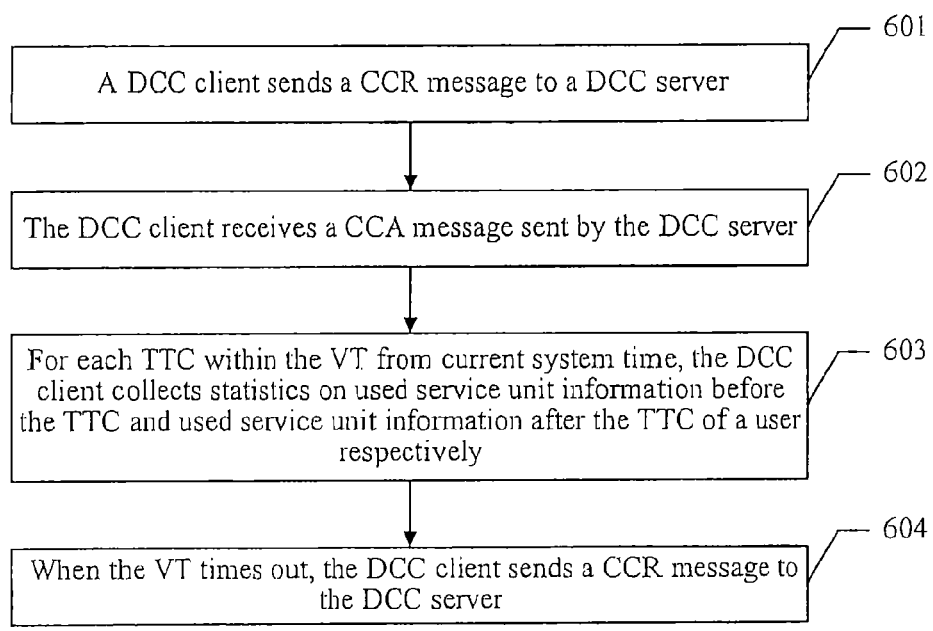
FIG. 6 is a schematic diagram of another embodiment of a method for controlling service charging of the present invention.

Because the DCC protocol is modified, the following performs illustration from the perspective of a DCC client. Referring to FIG. 6, another embodiment of the method for controlling service charging of the present invention includes the following:

601: A DCC client sends a CCR message to a DCC server.

In this embodiment, when requesting an OCS to allocate a granted service unit, a GGSN sends a CCR message to the OCS, where the CCR message may carry an RSU.

The DCC server in this embodiment may be the OCS or other similar charging systems; the DCC client may be the GGSN or other similar network elements.

In this embodiment, a case where merely the OCS and the GGSN are used as the DCC server and the DCC client respectively is taken as an example for illustrating.

602: The DCC client receives a CCA message sent by the DCC server.

The GGSN may receive the CCA message from the OCS, where the CCA message includes at least two TTCs and a preset VT.

603: For each TTC within the VT from current system time, the DCC client collects statistics on used service unit information before the TTC and used service unit information after the TTC of a user respectively.

Because multiple TTCs are included in the CCA message, for each TTC within the VT from the current system time, the GGSN collects statistics on the used service unit information before the TTC and the used service unit information after the TTC of the user respectively.

It should be noted that, if N TTCs are included in the CCA message, the GGSN may totally statistically obtain N+1 pieces of used service unit information, for example, the CCA message includes three TTCs, which are 10:00, 10:30, and 11:00 respectively, then the used service unit information statistically obtained by the GGSN is: used service unit information USU1 which is before 10:00, used service unit information USU2 of 10:00 to 10:29, used service unit information USU3 of 10:30 to 10:59, and used service unit information USU4 after 11:00.

604: When the VT times out, the DCC client sends a CCR message to the DCC server.

When the VT times out, the GGSN may send the CCR message to the OCS, where the CCR message may include the used service unit information statistically obtained in step 603, and may further include the RSU.

In this embodiment, a CCA message sent to a GGSN by an OCS may include multiple TTCs; the GGSN may, for each TTC, respectively collect statistics on used service unit information before the TTC and used service unit information after the TTC of a user, so that the GGSN is prevented from ignoring the TTC in the performance of collecting statistics on the used service unit, thereby effectively improving the accuracy of charging.

Figure 7:
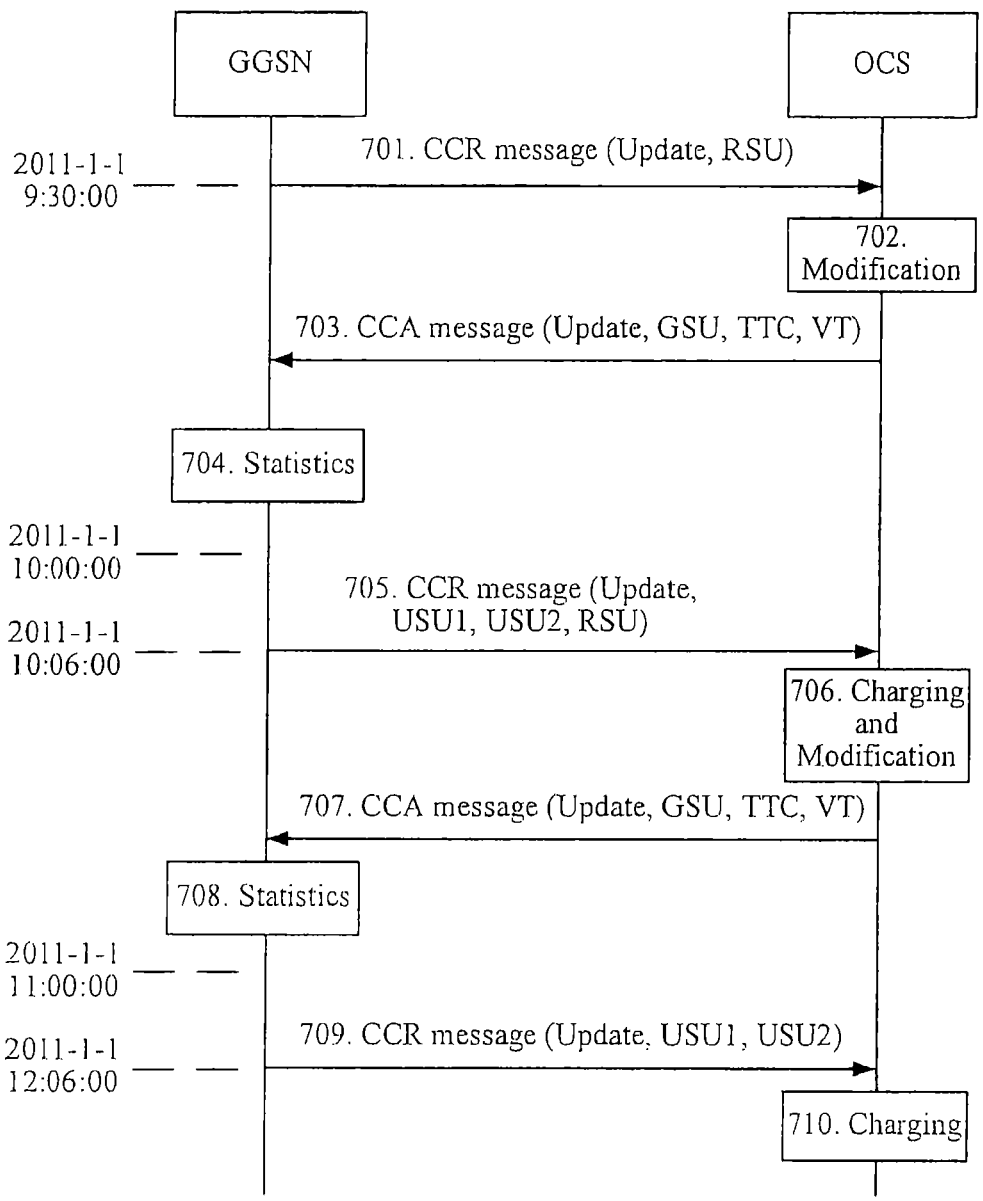
FIG. 7 is a schematic diagram of a process of controlling service charging of the present invention.

For convenience of understanding, a specific example is used below for illustrating. Referring to FIG. 7, a process of controlling service charging of the present invention includes the following:

701: A GGSN sends a CCR message to an OCS at 9:30:00.

The CCR message includes an update parameter Update and an RSU.

702: The OCS performs parameter modification.

After receiving the CCR message sent by the GGSN, the OCS determines current system time 9:30:00, and acquires a preset temporary VT, which is 7200 seconds in this embodiment.

The OCS judges the number of the TTCs included within 7200 seconds from 9:30:00. It is supposed that two TTCs are included, which are 10:00:00 and 11:00:00 respectively.

And then, the OCS may select any time between 10:00:00 and 11:00:00 according to a random algorithm. In this embodiment, the selected time is 10:06:00. According to the current system time 9:30:00 and the selected time 10:06:00, the OCS may determine that a time span is 2160 seconds, and then modify the VT to be 2160 seconds.

703: The OCS sends a CCA message to the GGSN.

The CCA message includes the update parameter Update, GSU, TTC and VT, where the TTC is 10:00:00, and the VT is 2160 seconds.

704: The GGSN starts collecting statistics.

The GGSN collects statistics on used service unit USU1 before 10:00:00 and used service unit USU2 after 10:00:00 respectively.

705: The GGSN sends a CCR message to the OCS.

When system time reaches 10:06:00, the VT times out, and then the GGSN sends the CCR message to the OCS, where the CCR message includes the update parameter Update, RSU, USU1 and USU2.

706: The OCS performs charging and parameter modification.

The OCS performs charging according to USU1, USU2, and different tariffs. Simultaneously, the OCS may perform parameter modification again.

The OCS determines the current system time 10:06:00, and acquires the preset temporary VT, which is 7200 seconds in this embodiment.

The OCS judges the number of the TTCs included within 7200 seconds from 10:06:00. It is supposed that one TTC is included, which is 11:00:00.

And then, the OCS may determine that the VT is 7200 seconds, and the TTC is 11:00:00.

707: The OCS sends a CCA message to the GGSN.

The CCA message includes the update parameter Update, GSU, TTC and VT, where the TTC is 11:00:00, and the VT is 7200 seconds.

708: The GGSN starts collecting statistics.

The GGSN collects statistics on the used service unit USU1 before 11:00:00 and the used service unit USU2 after 11:00:00 respectively.

709: The GGSN sends a CCR message to the OCS.

When the system time reaches 12:06:00, the VT times out, and then the GGSN sends the CCR message to the OCS, where the CCR message includes the update parameter Update, RSU, USU1 and USU2.

710: The OCS performs charging and parameter modification.

The OCS performs charging according to USU1, USU2, and different tariffs.

Figure 8:
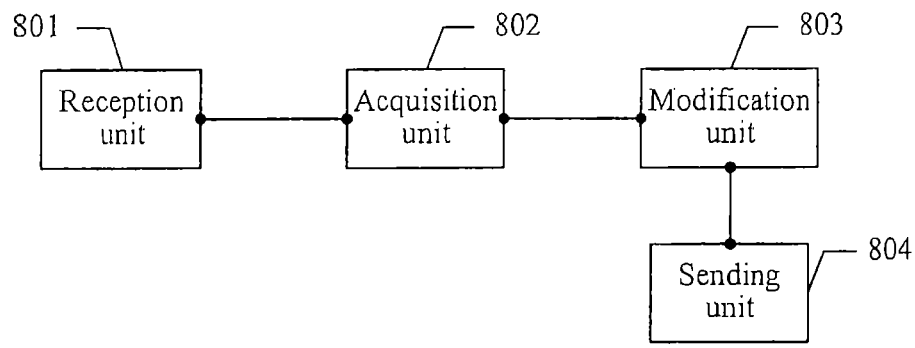
FIG. 8 is a schematic diagram of an embodiment of a DCC server of the present invention.

The above introduces the method for controlling service charging of the present invention, while the following introduces embodiments of devices of the present invention. Referring to FIG. 8, an embodiment of a DCC server of the present invention includes:

a reception unit 801, configure to receive a credit control request CCR message sent by a DCC client;

an acquisition unit 802, configured to: when at least two tariff time changes TTCs are included within a preset temporary validity time VT from current system time, acquire, from the at least two TTCs, a first TTC which is the earliest and a second TTC which is the second earliest;

a modification unit 803, configured to modify the temporary VT according to the first TTC and the second TTC to obtain a modified VT, so that only the first TTC is included in the modified VT from the current system time; and a sending unit 804, configured to send a credit control answer CCA message to the DCC client, where the CCA message includes the first TTC and the modified VT.

Figure 9:
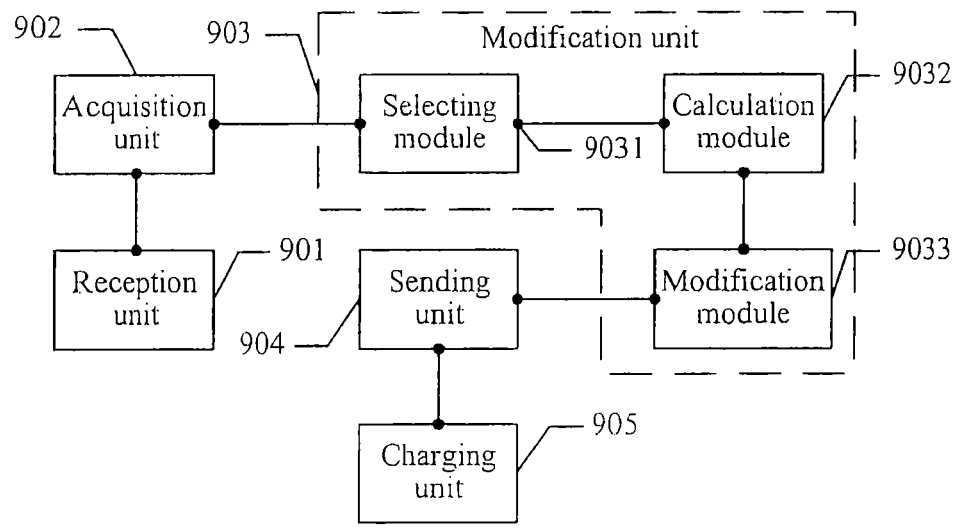
FIG. 9 is a schematic diagram of another embodiment of a DCC server of the present invention.

Referring to FIG. 9, another embodiment of the DCC server of the present invention includes:

a reception unit 901, configure to receive a credit control request CCR message sent by a DCC client;

an acquisition unit 902, configured to: when at least two tariff time changes TTCs are included within a preset temporary validity time VT from current system time, acquire, from the at least two TTCs, a first TTC which is the earliest and a second TTC which is the second earliest;

a modification unit 903, configured to modify the temporary VT according to the first TTC and the second TTC to obtain a modified VT, so that only the first TTC is included in the modified VT from the current system time; and a sending unit 904, configured to send a credit control answer CCA message to the DCC client, where the CCA message includes the first TTC and the modified VT.

The modification unit 903 in this embodiment may further include:

a selecting module 9031, configured to select any time between the first TTC and the second TTC according to a random algorithm;

a calculation module 9032, configured to calculate a time span from the current system time to the selected time; and a modification module 9033, configured to modify the temporary VT to be the calculated time span to obtain the modified VT.

The DCC server in this embodiment may further include:

a charging unit 905, configured to receive the CCR message including first used service unit information and second used service unit information that are sent by the DCC client, where the first used service unit information is used service unit information before the first TTC of a user, the second used service unit information is used service unit information after the first TTC of the user; and perform charging according to the first used service unit information, the second used service unit information, and preset tariffs.

For convenience of understanding, through a specific application scenario, the DCC server in this embodiment is illustrated below:

In this embodiment, when requesting the DCC server to allocate a granted service unit, the DCC client sends a CCR message to the reception unit 901, where the CCR message may carry an RSU.

The DCC server in this embodiment may be an OCS or other similar charging systems; the DCC client may be a GGSN or other similar network elements.

In this embodiment, a case where merely the OCS and the GGSN are respectively used as the DCC server and the DCC client is taken as an example for illustrating.

After the reception unit 901 receives the CCR message sent by the GGSN, the acquisition unit 902 may determine the current system time and acquire the preset temporary VT, where the temporary VT is generally 3600 seconds or 7200 seconds, and the specific numerical value is related to an actual application and is not limited here.

The acquisition unit 902 judges the number of the TTCs included within the preset temporary VT from the current system time. If it is found that at least two TTCs are included, the acquisition unit 902 may acquire, from the at least two TTCs according to a chronological sequence, the first TTC which is the earliest and the second TTC which is the second earliest.

After the acquisition unit 902 determines the first TTC and the second TTC, the selecting module 9031 may select any time between the first TTC and the second TTC according to the random algorithm.

It should be noted that, the random algorithm in this embodiment may be implemented by using a random function Rand ( ), and may also be implemented by using other manners, which is not limited here.

After the selecting module 9031 selects the time, the calculation module 9032 may calculate a time span from the current system time to the selected time.

It should be noted that, an order of magnitude of time spent in signaling transmitting between the GGSN and the OCS and an order of magnitude of time spent in internal processing performed by the OCS are all orders of millisecond, or even orders of microsecond, so that impacts of the time are ignored in this embodiment and the subsequent embodiments.

The modification module 9033 may modify the temporary VT by using the calculated time span. By modifying the temporary VT to be the calculated time span, the modified VT is obtained.

After the modification module 9033 obtains the modified VT, the sending unit 904 may send the CCA message to the GGSN, where the CCA message may include the aforementioned first TTC and modified VT, and in addition, may also include a GSU allocated to the user.

In this embodiment, after the reception unit 901 receives a CCR message sent by a GGSN, if at least two TTCs are included within a preset temporary VT from current system time, the acquisition unit 902 acquires, from the TTCs, a first TTC which is the earliest and a second TTC which is the second earliest, and the modification unit 903 modifies the temporary VT according to the first TTC and the second TTC to obtain a modified VT, so that only the first TTC is included in the modified VT from the current system time, that is, the modification unit 903 dynamically adjusts the VT, so that only one TTC may be included within each VT. Therefore, the GGSN is prevented from ignoring the TTC in a performance of collecting statistics on the used service unit, thereby effectively improving the accuracy of charging.

Figure 10:
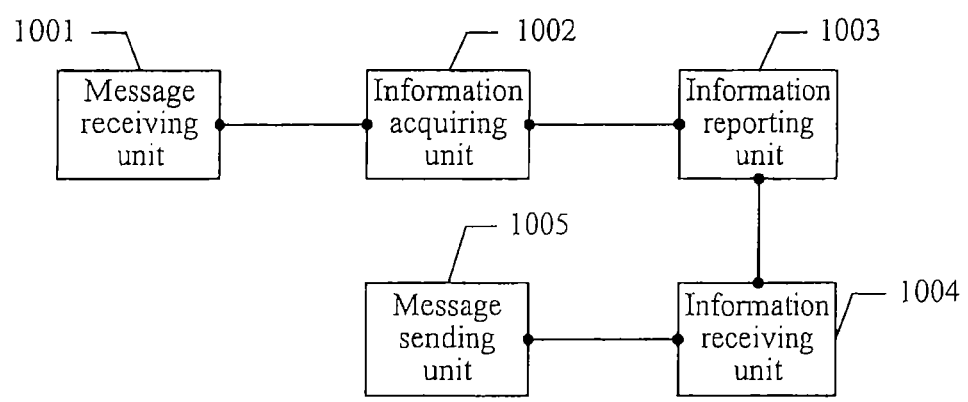
FIG. 10 is a schematic diagram of another embodiment of a DCC server of the present invention.

Referring to FIG. 10, another embodiment of the DCC server of the present invention includes:

a message receiving unit 1001, configure to receive a credit control request CCR message sent by a DCC client;

an information acquiring unit 1002, configured to acquire all tariff time changes TTCs included within a preset temporary validity time VT from current system time;

an information reporting unit 1003, configured to report, to a data processing device, the temporary VT and a TTC list including all the TTCs;

an information receiving unit 1004, configured to receive a first TTC and a modified VT that are fed back by the data processing device, where the modified VT is the VT obtained by the data processing device after modifying the temporary VT according to the first TTC and a second TTC; the first TTC and the second TTC are two TTCs which are relatively early within the preset temporary VT from the current system time; and a message sending unit 1005, configured to send a credit control answer CCA message to the DCC client, where the CCA message includes the first TTC and the modified VT.

For convenience of understanding, through a specific application scenario, the DCC server in this embodiment is illustrated below:

In this embodiment, when requesting the DCC server to allocate a granted service unit, the DCC client sends a CCR message to the message receiving unit 1001, where the CCR message may carry an RSU.

The DCC server in this embodiment may be an OCS or other similar charging systems; the DCC client may be a GGSN or other similar network elements.

In this embodiment, a case where merely the OCS and the GGSN are used as the DCC server and the DCC client respectively is taken as an example for illustrating.

After the message receiving unit 1001 receives the CCR message sent by the GGSN, the information acquiring unit 1002 determines the current system time and acquires the preset temporary VT, where the temporary VT is generally 3600 seconds or 7200 seconds, and a specific numerical value is related to an actual application and is not limited here.

The OCS is locally preset with a list including all TTCs, so that the information acquiring unit 1002 is capable of acquiring all the TTCs included within the preset temporary VT from the current system time.

The information acquiring unit 1002 determines all the TTCs included within the preset temporary VT from the current system time, so that the information reporting unit 1003 may report, to the data processing device, the temporary VT and the TTC list including the TTCs.

The data processing device in this embodiment may be an independent server or other network elements having a computing processing function, which is not specifically limited here.

After the information reporting unit 1003 sends a temporary VT and a TTC list to the data processing device, the information receiving unit 1004 is capable of receiving a first TTC and a modified VT from the data processing device, where the modified VT is the VT obtained by the data processing device after modifying the temporary VT according to the first TTC and a second TTC; the first TTC and the second TTC are two TTCs which are relatively early within the preset temporary VT from the current system time.

And then, the message sending unit 1005 may send the CCA message to the GGSN, where the CCA message may include the aforementioned first TTC and modified VT, and in addition, may also include a GSU allocated to the user.

In this embodiment, after the message receiving unit 1001 receives a CCR message sent by a GGSN, the information acquiring unit is capable of acquiring all TTCs included within a preset temporary VT from current system time. The information reporting unit 1003 sends the temporary VT and the TTCs to a data processing device. After the information receiving unit 1004 receives a first TTC and a modified VT from the data processing device, the message sending unit 1005 may send a CCA message to the GGSN. Because only the first TTC is included in the modified VT from the current system time, that is, only one TTC may be included in each VT, the GGSN may be prevented from ignoring the TTC in a performance of collecting statistics on the used service unit, thereby effectively improving the accuracy of charging.

Figure 11:
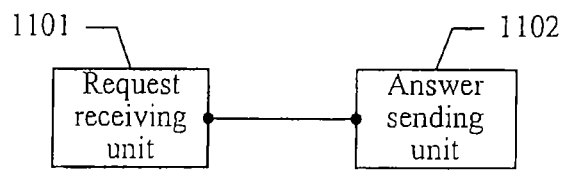
FIG. 11 is a schematic diagram of another embodiment of a DCC server of the present invention.

Referring to FIG. 11, another embodiment of the DCC server of the present invention includes:

a request receiving unit 1101, configure to receive a credit control request CCR message sent by a DCC client; and an answer sending unit 1102, configured to: when at least two tariff time changes TTCs are included within a preset validity time VT from current system time, send a credit control answer CCA message to the DCC client, where the CCA message includes the at least two TTCs and the VT.

For convenience of understanding, through a specific application scenario, the DCC server in this embodiment is illustrated below:

In this embodiment, when requesting the DCC server to allocate a granted service unit, the DCC client sends a CCR message to the request receiving unit 1101, where the CCR message may carry an RSU.

The DCC server in this embodiment may be an OCS or other similar charging systems; the DCC client may be a GGSN or other similar network elements.

In this embodiment, a case where merely the OCS and the GGSN are used as the DCC server and the DCC client respectively is taken as an example for illustrating.

In this embodiment, if the answer sending unit 1102 judges that at least two TTCs are included within the preset VT from the current system time, the answer sending unit 1102 may send the CCA message to the GGSN, where the CCA message includes the VT and the at least two TTCs.

In this embodiment, after the request receiving unit 1101 receives a CCR message sent by a GGSN, the answer sending unit 1102 may acquire TTCs included within a preset VT from current system time, and send the VT and the TTCs to the GGSN through a CCA message, so that the GGSN is prevented from ignoring the TTC in a performance of collecting statistics on the used service unit, thereby effectively improving the accuracy of charging.

Figure 12:
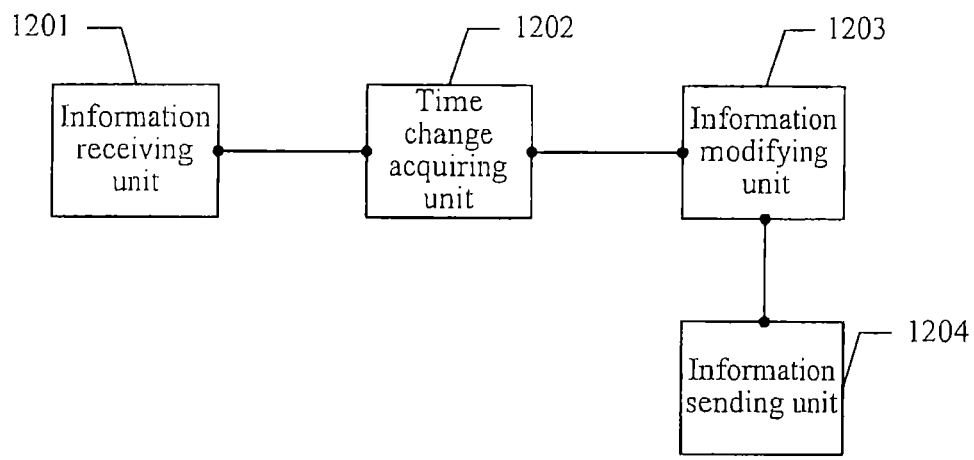
FIG. 12 is a schematic diagram of an embodiment of a data processing device of the present invention.

Referring to FIG. 12, an embodiment of a data processing device of the present invention includes:

an information receiving unit 1201, configured to receive a tariff time change TTC list and a preset temporary validity time VT that are sent by a DCC server;

a time change acquiring unit 1202, configured to: when the TTC list includes at least two TTCs, acquire, from the TTC list, a first TTC which is the earliest and a second TTC which is the second earliest;

an information modifying unit 1203, configured to modify the temporary VT according to the first TTC and the second TTC to obtain a modified VT, so that only the first TTC is included in the modified VT from current system time; and an information sending unit 1204, configured to feed back the first TTC and the modified VT to the DCC server.

For convenience of understanding, through a specific application scenario, the data processing device in this embodiment is illustrated below:

When an OCS receives the CCR message from a GGSN, the OCS may send the TTC list and the preset temporary VT to the data processing device, so that the information receiving unit 1201 may receive the tariff time change TTC list and the preset temporary validity time VT that are sent by the OCS.

The DCC server in this embodiment may be an OCS or other similar charging systems; the DCC client may be a GGSN or other similar network elements.

In this embodiment, a case where merely the OCS and the GGSN are used as the DCC server and the DCC client respectively is taken as an example for illustrating.

The TTC list includes all TTCs included within the preset temporary VT from the current system time. If the time change acquiring unit 1202 determines that at least two TTCs are included in the TTC list, the time change acquiring unit 1202 may acquire, from the TTC list, the first TTC which is the earliest and the second TTC which is the second earliest.

The information modifying unit 1203 may modify the temporary VT according to the first TTC and the second TTC to obtain the modified VT, so that only the first TTC is included in the modified VT from the current system time.

After the information modifying unit 1203 determines the first TTC and the modified VT, the information sending unit 1204 may feed back the first TTC and the modified VT to the OCS.

In this embodiment, the information modifying unit 1203 may modify a temporary VT according to a first TTC and a second TTC to obtain a modified VT, so that only the first TTC is included in the modified VT from current system time, and the information sending unit 1204 may send the first TTC and the modified VT to an OCS, that is, a data processing device dynamically adjusts the VT, so that only one TTC may be included in each VT. Therefore, a GGSN is prevented from ignoring the TTC in a performance of collecting statistics on the used service unit, thereby effectively improving the accuracy of charging.

Figure 13:
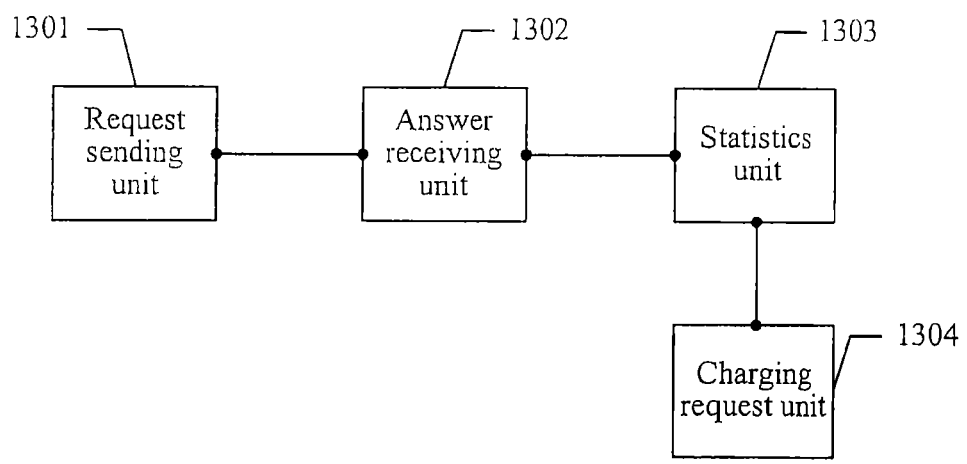
FIG. 13 is a schematic diagram of an embodiment of a DCC client of the present invention.

Referring to FIG. 13, an embodiment of a DCC client of the present invention includes: a request sending unit 1301, configure to send a credit control request CCR message to a DCC server;

an answer receiving unit 1302, configured to receive a credit control answer CCA message sent by the DCC server, where the CCA message includes at least two TTCs and a preset VT;

a statistics unit 1303, configured to: for each TTC within the VT from current system time, collect statistics on used service unit information before the TTC and used service unit information after the TTC of a user respectively; and a charging request unit 1304, configured to: when the VT times out, send the CCR message to the DCC server, where the CCR message includes the used service unit information that is statistically obtained.

For convenience of understanding, through a specific application scenario, the DCC client in this embodiment is illustrated below:

In this embodiment, when the DCC client requests the DCC server to allocate a granted service unit, the request sending unit 1301 sends the CCR message to the DCC server, where the CCR message may carry an RSU.

The DCC server in this embodiment may be an OCS or other similar charging systems; the DCC client may be a GGSN or other similar network elements.

In this embodiment, a case where merely the OCS and the GGSN are used as the DCC server and the DCC client respectively is taken as an example for illustrating.

The answer receiving unit 1302 may receive the CCA message from the OCS, where the CCA message includes at least two TTCs and the preset VT.

Because multiple TTCs are included in the CCA message, for each TTC within the VT from the current system time, the statistics unit 1303 collects statistics on the used service unit information before the TTC and the used service unit information after the TTC of the user respectively.

It should be noted that, if N TTCs are included in the CCA message, the statistics unit 1303 may totally statistically obtain N+1 pieces of used service unit information, for example, the CCA message includes three TTCs, which are 10:00, 10:30, and 11:00 respectively, then used service unit information statically obtained by the statistics unit 1303 is: used service unit information USU1 before 10:00, used service unit information USU2 from 10:00 to 10:29, used service unit information USU3 from 10:30 to 10:59, and used service unit information USU4 after 11:00.

When the VT times out, the charging request unit 1304 may send the CCR message to the OCS, where the CCR message may include the used service unit information statically obtained by the statistics unit 1303, and may also include an RSU.

In this embodiment, a CCA message sent to the request sending unit 1301 by an OCS may include multiple TTCs; the statistics unit 1303 may, for each TTC, respectively collect statistics on used service unit information before the TTC and used service unit information after the TTC of a user, so that a GGSN is prevented from ignoring the TTC in the performance of collecting statistics on the used service unit, thereby effectively improving the accuracy of charging.

Persons skilled in the art may understand that all or part of the steps of the method according to the embodiments of the present invention may be implemented by a program instructing relevant hardware. The program may be stored in a computer readable storage medium, such as a read-only memory, a magnetic disk, or an optical disk.

The above introduces the method and related device for controlling service charging of the present invention in detail. Persons skilled in the art may make variations and modifications to the present invention in terms of the specific implementations and application scopes according to the ideas of the embodiments of the present invention. Therefore, the specification shall not be construed as a limit to the present invention.

What is claimed is:

1. A method for controlling service charging, comprising:
receiving, by a Diameter credit control DCC server, a credit control request CCR message sent by a DCC client;
if at least two tariff time changes TTCs are comprised in a preset temporary validity time VT from current system time, acquiring, by the DCC server and from the at least two TTCs, a first TTC which is the earliest and a second TTC which is the second earliest;
modifying, by the DCC server, the temporary VT according to the first TTC and the second TTC to obtain a modified VT, so that only the first TTC is comprised in the modified VT from the current system time; and
sending, by the DCC server, a credit control answer CCA message to the DCC client, wherein the CCA message comprises the first TTC and the modified VT.

2. The method according to claim 1, wherein the modifying, by the DCC server, the temporary VT according to the first TTC and the second TTC to obtain the modified VT comprises: selecting, by the DCC server, any time between the first TTC and the second TTC according to a random algorithm;
calculating, by the DCC server, a time span from the current system time to the selected time; and
modifying, by the DCC server, the temporary VT to be the calculated time span to obtain the modified VT.

3. The method according to claim 1, wherein after the sending, by the DCC server, the credit control answer CCA message to the DCC client, the method comprises: receiving, by the DCC server, a CCR message comprising first used service unit information and second used service unit information that are sent by the DCC client, wherein the first used service unit information is used service unit information before the first TTC of a user, and the second used service unit information is used service unit information after the first TTC of the user; and
performing, by the DCC server, charging according to first used service unit information, the second used service unit information, and preset tariffs.

4. A method for controlling service charging, comprising:
receiving, by a Diameter credit control DCC server, a credit control request CCR message sent by a DCC client;
acquiring, by the DCC server, all tariff time changes TTCs comprised within a preset temporary validity time VT from current system time;
reporting, by the DCC server, the temporary VT and a TTC list comprising all the TTCs, to a data processing device;
receiving, by the DCC server, a first TTC and a modified VT that are fed back by the data processing device, wherein the modified VT is the VT obtained by the data processing device after modifying the temporary VT according to the first TTC and a second TTC; the first TTC and the second TTC are two TTCs which are within the preset temporary VT from the current system time; and
sending, by the DCC server, a credit control answer CCA message to the DCC client, wherein the CCA message comprises the first TTC and the modified VT.

5. A method for controlling service charging, comprising:
receiving, by a data processing device, a tariff time change TTC list and a preset temporary validity time VT that are sent by a DCC server;
if the TTC list comprises at least two TTCs, acquiring, by the data processing device and from the TTC list, a first TTC which is the earliest and a second TTC which is the second earliest;
modifying, by the data processing device, the temporary VT according to the first TTC and the second TTC to obtain a modified VT, so that only the first TTC is comprised in the modified VT from current system time; and
feeding back, by the data processing device, the first TTC and the modified VT to the DCC server.

6. The method according to claim 5, wherein the modifying, by the data processing device, the temporary VT according to the first TTC and the second TTC to obtain the modified VT comprises: selecting, by the data processing device, any time between the first TTC and the second TTC according to a random algorithm;
calculating, by the data processing device, a time span from the current system time to the selected time; and
modifying, by the data processing device, the temporary VT to be the calculated time span to obtain the modified VT.

7. A method for controlling service charging, comprising:
receiving, by a Diameter credit control DCC server, a credit control request CCR message sent by a DCC client; and
if at least two tariff time changes TTCs are comprised within a preset validity time VT from current system time, sending, by the DCC server, a credit control answer CCA message to the DCC client, wherein the CCA message comprises the at least two TTCs and the VT.

8. A method for controlling service charging, comprising:
sending, by a Diameter credit control DCC client, a credit control request CCR message to a DCC server;
receiving, by the DCC client, a credit control answer CCA message sent by the DCC server, wherein the CCA message comprises at least two TTCs and a preset VT;
for each TTC within the VT from current system time, collecting, by the DCC client, statistics on used service unit information before the TTC and used service unit information after the TTC of a user respectively; and
when the VT times out, sending, by the DCC client, a CCR message to the DCC server, wherein the CCR message comprises the used service unit information that is statistically obtained.

9. A DCC server, comprising:
a reception unit, configure to receive a credit control request CCR message sent by a DCC client;
an acquisition unit, configured to: when at least two tariff time changes TTCs are comprised within a preset temporary validity time VT from current system time, acquire, from the at least two TTCs, a first TTC which is the earliest and a second TTC which is the second earliest;
a modification unit, configured to modify the temporary VT according to the first TTC and the second TTC to obtain a modified VT, so that only the first TTC is comprised in the modified VT from the current system time; and
a sending unit, configured to send a credit control answer CCA message to the DCC client, wherein the CCA message comprises the first TTC and the modified VT.

10. The DCC server according to claim 9, wherein the modification unit comprises:
a selecting module, configured to select any time between the first TTC and the second TTC according to a random algorithm;
a calculation module, configured to calculate a time span from the current system time to the selected time; and
a modification module, configured to modify the temporary VT to be the calculated time span to obtain the modified VT.

11. The DCC server according to claim 9, wherein the DCC server further comprises:
a charging unit, configured to receive the CCR message comprising first used service unit information and second used service unit information that are sent by the DCC client, wherein the first used service unit information is used service unit information before the first TTC of a user, the second used service unit information is used service unit information after the first TTC of the user; and perform charging according to the first used service unit information, the second used service unit information, and preset tariffs.

12. A DCC server, comprising:
a message receiving unit, configure to receive a credit control request CCR message sent by a DCC client;
an information acquiring unit, configured to acquire all tariff time changes TTCs comprised within a preset temporary validity time VT from current system time;
an information reporting unit, configured to report, to a data processing device, the temporary VT and a TTC list comprising all the TTCs;
an information receiving unit, configured to receive a first TTC and a modified VT that are fed back by the data processing device, wherein the modified VT is the VT obtained by the data processing device after modifying the temporary VT according to the first TTC and a second TTC; the first TTC and the second TTC are two TTCs which are within the preset temporary VT from the current system time; and
a message sending unit, configured to send a credit control answer CCA message to the DCC client, wherein the CCA message comprises the first TTC and the modified VT.

13. A data processing device, comprising:
an information receiving unit, configured to receive a tariff time change TTC list and a preset temporary validity time VT that are sent by a DCC server;
a time change acquiring unit, configured to: when the TTC list comprises at least two TTCs, acquire, from the TTC list, a first TTC which is the earliest and a second TTC which is the second earliest;
an information modifying unit, configured to modify the temporary VT according to the first TTC and the second TTC to obtain a modified VT, so that only the first TTC is comprised in the modified VT from current system time; and
an information sending unit, configured to feed back the first TTC and the modified VT to the DCC server.

14. A DCC server, comprising:
a request receiving unit, configure to receive a credit control request CCR message sent by a DCC client; and
an answer sending unit, configured to: when at least two tariff time changes TTCs are comprised within a preset validity time VT from current system time, send a credit control answer CCA message to the DCC client, wherein the CCA message comprises the at least two TTCs and the VT.

15. A DCC client, comprising:
a request sending unit, configure to send a credit control request CCR message to a DCC server;
an answer receiving unit, configured to receive a credit control answer CCA message sent by the DCC server, wherein the CCA message comprises at least two TTCs and a preset VT;
a statistics unit, configured to: for each TTC within the VT from current system time, collect statistics on used service unit information before the TTC and used service unit information after the TTC of a user respectively; and
a charging request unit, configured to: when the VT times out, send a CCR message to the DCC server, wherein the CCR message comprises the used service unit information that is statistically obtained.

* * * * *